United States Patent Office
2,862,896
Patented Dec. 2, 1958

2,862,896
LAMINATE ADHESIVE COMPRISING A PROTEIN AND A QUADRICOMPONENT INTERPOLYMER AND PROCESS FOR PREPARING SAME

Joseph B. Dede, West Springfield, and Donald A. Watson, Springfield, Mass., assignors to Monsanto Chemical Company, St. Louis, Mo., a corporation of Delaware No Drawing. Application July 17, 1956
Serial No. 598,235

8 Claims. (Cl. 260—8)

This invention relates to modified protein adhesives. More particularly, the invention relates to modified protein adhesives which are suitable for use in laminating wood or a wood product to itself or to other materials. The invention also relates to methods of laminating wood or a wood product to itself or to other materials by the use of these modified protein adhesives.

Adhesives based on proteins such as casein, soybean, blood albumin, etc. and mixtures thereof have been found effective for gluing porous woods in making plywood and related products. These adhesives have the important advantage of being able to set to a firm bond at ordinary temperatures. However, they have the disadvantage of producing a weak bond when used for gluing hardwoods.

One object of this invention is to provide new adhesives.
Another object is to provide modified protein adhesives.
Another object is to provide modified protein adhesives which are particularly suitable for gluing hardwoods to themselves or to other materials.
A further object is to provide a method of laminating wood or a wood product to itself or to other materials by the use of the modified protein adhesives.

These and other objects are attained by combining a protein adhesive with a latex of a quadricomponent interpolymer as hereinafter described and laminating wood or a wood product to itself or to another material with the modified protein adhesive between the two surfaces to be joined.

The following examples are given to illustrate the invention. Where parts are mentioned, they are parts by weight.

EXAMPLE I

A dry base for a protein glue is prepared by dry blending 15 parts of casein, 53 parts of soybean flour, and sufficient amounts of conventional additives such as defoaming oils, wood flour, sodium fluoride, sodium carbonate, hydrated lime, etc. to make 100 parts of dry blend. One hundred parts of the dry blend are stirred into 200 parts of water until a smooth paste is formed; the mix is allowed to stand for about 15 minutes, and another 40 parts of water are added with agitation. Stirring is continued for about 15 minutes, and 85 parts of a 50% solids latex of the quadricomponent interpolymer of the invention are added. Stirring is then continued until the latex is thoroughly blended with the protein paste. The glue is now ready for use.

Other formulae which can be used in making the adhesive of the invention are given in Table I.

Table I

| Ingredient | Parts by weight | | | |
|---|---|---|---|---|
| | A | B | C | D |
| Casein | 58 | 15 | 43 | |
| Soybean | | 53 | 44 | 95 |
| Blood | | | 5 | |
| Additives | 42 | 32 | 45 | 50 |
| Interpolymer latex [1] | 68 | 34 | 103 | 115 |
| Added Water | 170 | 240 | 274 | 290 |

[1] 50% solids latex of an interpolymer of 52% styrene, 6% acrylonitrile, 2% methacrylic acid and 40% 2-ethyl hexyl acrylate.

Adhesives made by the above formulae are especially effective for gluing wood or a wood product such as chipboard, hardboard, etc. to itself or to other materials such as melamine decorative laminates, polyester decorative laminates, metals, such as aluminum, etc.

The following examples illustrate the lamination of woods with the adhesives of the invention.

EXAMPLE II

A laminate is prepared by coating both sides of a fir core with about 55 pounds per 1000 square feet of glue line of the glue of Example I, placing a mahogany ply on either side of the core to form a sandwich, pressing the assembly for about 25 minutes at 60–200 p. s. i. at room temperature, and removing the pressure. Trimming of the laminate may be accomplished 3 to 4 hours after pressing. Efforts to separate the plies of the set laminate result in about 80% wood failure and little or no glue failure.

EXAMPLE III

A resin-impregnated paper decorative laminate is bonded to fir plywood using an adhesive made by Formula A of Table I and pressing the assembly for about 25 minutes at 60–200 p. s. i. at room temperature. Attempts to separate the plies of the final set laminate result in 90–100% combined decorative laminate and wood failure with little or no glue failure.

EXAMPLE IV

A wood core, coated on both sides with about 45 pounds per 1000 square feet of glue line of an adhesive made by Formula A of Table I, is sandwiched between two mahogany plies having the surfaces contacting the adhesive coated with an aqueous solution of tris(hydroxymethyl)nitromethane. The assembly is pressed for about 5 minutes at room temperature using a pressure of 45 p. s. i. The pressure is removed, and the laminate is allowed to stand to set the bond. The plies of the set laminate cannot be separated without substantially 100% wood failure and little or no glue failure.

The quadricomponent interpolymer of the invention is an interpolymer containing (1) 35 to 60 parts by weight of an unsaturated ester of the group consisting of straight chain and branched chain alkyl acrylates and alkyl methacrylates wherein the alkyl radical contains about 5 to 20 carbon atoms and has about 5 to 14 carbon atoms in the longest continuous chain thereof, (2) 3 to 10 parts by weight of an unsaturated nitrile of the group consisting of acrylonitrile and methacrylonitrile, (3) 2 to 5 parts by weight of an unsaturated monocarboxylic acid of the group consisting of acrylic acid, methacrylic acid, cinnamic acid, atropic acid and crotonic acid, and (4) correspondingly, 60 to 25 parts by weight of a monovinylidene aromatic hydrocarbon. For example, the interpolymer may contain 52% styrene, 6% acrylonitrile, 2% methacrylic acid, and 40% 2-ethyl hexyl acrylate.

The interpolymers are prepared by partially polymerizing all of the unsaturated nitrile component with from 1.5 to 3 times its weight of the vinylidene aromatic hydrocarbon component, adding all the remaining components, and completing the interpolymerization reaction. These interpolymers and processes for preparing them are more completely described in patent application Serial Number 467,654, filed November 8, 1954, in the name of Ernest Alexander Sutton, now U. S. Patent 2,767,153.

The interpolymer is added to the protein glue as an aqueous latex. On a dry weight basis, the amount of interpolymer incorporated in the protein-latex adhesive may vary from about 1 to 190 parts by weight of the interpolymer per 100 parts of dry protein.

The proteins forming a basis for the adhesives of the invention are proteins of animal or vegetable origin which are dispersible in water and at least partially soluble in alkali. Casein, soybean, and blood albumin, either singly or in admixture, are the proteins commonly used, but other proteins such as zein, peanut protein, etc. are also operative in this invention.

The amount of added water in the protein-latex adhesive varies with the viscosity desired for a particular glue. Ordinarily the adhesive includes about 65 to 350 parts of added water per 100 parts of dry protein. The optimum spreading viscosity of these adhesives is between 15 and 40 on the MacMichael viscosimeter using a 22 wire and cross arm bobbin. When wood is glued to wood by the no-clamp process of lamination, the preferred wet glue spread is 40 to 60 pounds per 1000 square feet of glue line. When non-porous surfaces such as decorative laminates are glued to wood by the same process, the preferred spread range is 30 to 50 pounds per 1000 square feet of glue line.

The additives included in these adhesives are the conventional additives used in protein glues. Among the more common additives are compounds of alkali metals and alkaline earth metals such as the chlorides, fluorides, carbonates, phosphates, oxides, and hydroxides, defoaming oils such as pine oil, fillers such as wood flour, walnut shell flour, etc.

Although the adhesives of this invention are satisfactory for laminating woods by a no-clamp process without the aid of a catalyst, it has been found that shorter pressing times and smaller amounts of adhesive may be used when an aldehyde or an aldehyde donor is used to speed formation of the bond. Suitable aldehydes and aldehyde donors include formaldehyde, paraformaldehyde, and water-soluble reaction products of an aldehyde with a nitroparaffin or an amide, for example, tris(hydroxymethyl)nitromethane. The aldehyde or aldehyde donor should be applied to a surface carrying no adhesive and the surface thus treated should be positioned against a different surface carrying adhesive.

The adhesives of this invention are effective glues for softwoods but are particularly advantageous for gluing hardwoods and for bonding decorative laminates to wood. The improved character of the bond obtained with the protein-latex adhesives over the bond obtained with protein adhesives in the lamination of pine to birch is illustrated in Table II.

Table II

| Sample [1] | Glue | Wood failure, percent |
| --- | --- | --- |
| A | Casein-soybean | 10 |
| B | Casein-soybean, 10% latex [2] | 30 |
| C | Casein-soybean, 25% latex [2] | 20 |
| D | Casein-soybean, 40% latex [2] | 40 |

[1] All samples are laminates of a pine lumber core with a birch plywood face, prepared by the same laminating process under the same laminating conditions.
[2] Percentage of wet latex based on wet protein glue.

It is obvious that many variations may be made in the products and processes set forth above without departing from the spirit and scope of the invention.

What is claimed is:

1. An adhesive comprising an aqueous dispersion of 100 parts by weight of a protein of the group consisting of casein, soybean, blood albumin, zein, peanut protein, and mixtures thereof and 1–190 parts by weight of a quadricomponent interpolymer of (1) 35–60 parts by weight of an unsaturated ester of the group consisting of alkyl acrylates and alkyl methacrylates wherein the alkyl radical contains 5–20 carbon atoms and has 5–14 carbon atoms in the longest continuous chain thereof, (2) 3–10 parts by weight of an unsaturated nitrile of the group consisting of acrylonitrile and methacrylonitrile, (3) 2–5 parts by weight of an unsaturated monocarboxylic acid of the group consisting of acrylic acid, methacrylic acid, cinnamic acid, atropic acid, and crotonic acid, and (4) correspondingly, 60–25 parts by weight of a monovinylidene aromatic hydrocarbon of the group consisting of styrene, alkyl-substituted styrene, halogen-substituted styrene, vinyl naphthalene, and mixtures thereof, said interpolymer having been prepared by partially polymerizing all of the unsaturated nitrile component with from 1.5 to 3 times its weight of the monovinylidene aromatic hydrocarbon component and completing the interpolymerization reaction after adding all of the remaining components.

2. An adhesive as in claim 1 wherein the protein is casein.

3. An adhesive as in claim 1 wherein the protein is soybean protein.

4. An adhesive as in claim 1 wherein the protein is a mixture of casein and soybean protein.

5. An adhesive as in claim 1 wherein the protein is a mixture of casein, soybean protein and soluble blood.

6. An adhesive as in claim 1 wherein the interpolymer contains 52 parts by weight of styrene, 6 parts by weight of acrylonitrile, 2 parts by weight of methacrylic acid, and 40 parts by weight of 2-ethyl hexyl acrylate.

7. A laminate comprising a plurality of surfaces, at least one of which surfaces is a material of the group consisting of wood and wood products, said surfaces being bonded together by means of the adhesive of claim 1.

8. A process for preparing an adhesive which comprises dispersing in water 100 parts by weight of a protein of the group consisting of casein, soybean, blood albumin, zein, peanut protein, and mixtures thereof and adding to the dispersion an aqueous latex comprising 1–190 parts by weight of a quadricomponent interpolymer of (1) 35–60 parts by weight of an unsaturated ester of the group consisting of alkyl acrylates and alkyl methacrylates wherein the alkyl radical contains 5–20 carbon atoms and has 5–14 carbon atoms in the longest continuous chain thereof, (2) 3–10 parts by weight of an unsaturated nitrile of the group consisting of acrylonitrile and methacrylonitrile, (3) 2–5 parts by weight of an unsaturated monocarboxylic acid of the group consisting of acrylic acid, methacrylic acid, cinnamic acid, atropic acid, and crotonic acid, and (4) correspondingly, 60–25 parts by weight of a monovinylidene aromatic hydrocarbon of the group consisting of styrene, alkyl-substituted styrene, halogen-substituted styrene, vinyl naphthalene, and mixtures thereof, said interpolymer having been prepared by partially polymerizing all of the unsaturated nitrile component with from 1.5 to 3 times its weight of the monovinylidene aromatic hydrocarbon component and completing the interpolymerization reaction after adding all of the remaining components.

References Cited in the file of this patent

UNITED STATES PATENTS

| | | |
|---|---|---|
| 2,010,012 | Collins | Aug. 6, 1935 |
| 2,486,241 | Arnold | Oct. 25, 1949 |
| 2,600,388 | Beckel et al. | June 17, 1952 |
| 2,767,153 | Sutton | Oct. 16, 1956 |
| 2,772,166 | Fowler | Nov. 27, 1956 |